(No Model.)

E. F. SCHLOSSER.
GALVANIC BATTERY.

No. 282,784. Patented Aug. 7, 1883.

WITNESSES:
James G. Deemer
C. Sedgwick

INVENTOR:
E. F. Schlosser
BY Munn & Co.
ATTORNEYS.

UNITED STATES PATENT OFFICE.

E. FRANK SCHLOSSER, OF HOBOKEN, NEW JERSEY.

GALVANIC BATTERY.

SPECIFICATION forming part of Letters Patent No. 282,784, dated August 7, 1883.

Application filed May 3, 1883. (No model.)

*To all whom it may concern:*

Be it known that I, EDW. FRANK SCHLOSSER, of Hoboken, in the county of Hudson and State of New Jersey, have invented a new and Improved Galvanic Battery, of which the following is a full, clear, and exact description.

My invention consists, principally, in arranging the carbon plates and zincs in the battery in such manner that both sides of the carbon plates are utilized, thus obtaining greater working-surface of carbon in the battery than heretofore.

The invention also consists of the construction, arrangement, and combination of the parts of the battery, all as hereinafter described and claimed.

Reference is to be had to the accompanying drawings, forming a part of this specification, in which similar letters of reference indicate corresponding parts in all the figures.

Figure 1:
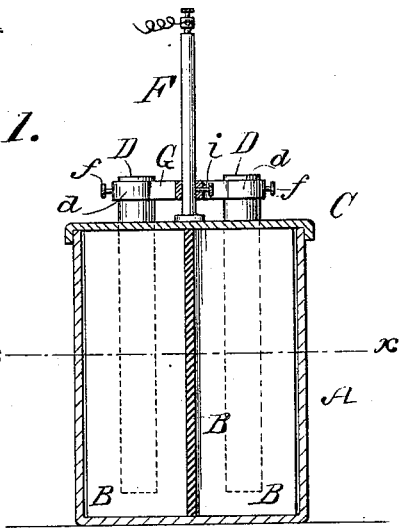
Figure 2:
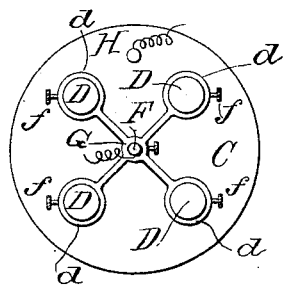
Figure 3:
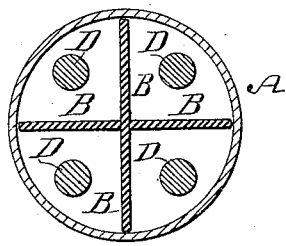

Figure 1 is a sectional elevation of my new and improved battery. Fig. 2 is a plan view of the same, and Fig. 3 is a sectional plan view taken on the line $x\,x$ of Fig. 1.

The glass vessel A is of the usual form and size.

B B are the carbon plates. These are, by preference, attached to the under side of the cover C, and are crossed or arranged radially, forming angles into which the zincs D D are suspended, as shown in Fig. 3.

The cover C may be of wood or of any suitable insulating material. Upon the upper side of the cover is secured the metallic rod F, which is made one of the poles of the battery by the metallic spider G, that holds the zincs.

H is a binding-post, which reaches through the cover C, and is connected with the carbon plates, and constitutes the other pole of the battery. The zincs are held in the collars $d$ of the spider G by the set-screws $f$, so that they may be raised or lowered, as desired.

The spider G is held upon the rod F by the set-screw $i$, and by means of this screw the spider may be raised and lowered upon the rod for raising or lowering the zincs, or for removing the zincs from the battery without disturbing the carbon plates.

A solution of sal-ammonia or any other exciting-fluid may be used in the battery.

By crossing the carbon plates and placing the zincs in the corners or cells thus formed it will be seen that both sides of the carbon plates are utilized, thus bringing a very large carbon surface into action, increasing the force of the battery, and by arranging the parts of the battery as shown the zincs may be easily raised out of the solution when the battery is not in use, and easily adjusted for submerging more or less of their length into the solution according to the strength of current desired; and the zincs and carbons may be easily removed together from the vessel A, for cleaning, and as easily replaced by lifting the cover C off from and replacing it upon the vessel A.

Having thus described my invention, I claim as new and desire to secure by Letters Patent—

1. The carbon plates B, arranged to form angles or cells, in combination with the zincs D, placed in the spaces formed by the carbons, whereby both sides of the carbons are utilized, substantially as described.

2. The battery herein shown and described, consisting of the vessel A, crossed carbon plates B, secured to the cover C, and the rod F, secured to the upper side of the cover, in combination with the adjustable spider G, for holding the zincs D, substantially as and for the purposes set forth.

EDW. FRANK SCHLOSSER.

Witnesses:
CHARLES J. SCHLOSSER,
GEORGE DIRSING, Jr.